United States Patent
Isowaki et al.

(10) Patent No.: US 10,083,711 B1
(45) Date of Patent: Sep. 25, 2018

(54) MAGNETIC RECORDING APPARATUS AND RECORDING CURRENT CONTROL APPARATUS

(71) Applicant: KABUSHIKI KAISHA TOSHIBA, Tokyo (JP)

(72) Inventors: Yousuke Isowaki, Yokohama Kanagawa (JP); Katsuya Sugawara, Kawasaki Kanagawa (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 15/913,736

(22) Filed: Mar. 6, 2018

(30) Foreign Application Priority Data

Aug. 1, 2017 (JP) ................... 2017-149439

(51) Int. Cl.
*G11B 5/09* (2006.01)
*G11B 7/0045* (2006.01)

(52) U.S. Cl.
CPC ...................... *G11B 5/09* (2013.01)

(58) Field of Classification Search
CPC ..... G11B 27/36; G11B 5/012; G11B 2220/20; G11B 20/1426; G11B 5/09; G11B 20/10009; G11B 7/005; G11B 7/0062; G11B 7/126; G11B 7/00456
USPC .................. 360/31, 110, 61, 55, 45, 67, 40; 369/59.1, 59.11, 59.12, 59.23
See application file for complete search history.

(56) References Cited

U.S. PATENT DOCUMENTS

| 6,650,493 B2 | 11/2003 | Dakroub |
| 7,880,988 B2 | 2/2011 | Ahn |
| 8,699,161 B2 | 4/2014 | Livshitz et al. |
| 9,601,152 B2 * | 3/2017 | Dina ............... G11B 20/10222 |

FOREIGN PATENT DOCUMENTS

| JP | 2003-529871 A | 10/2003 |
| JP | 5096185 82 | 12/2012 |
| JP | 2013-186936 A | 9/2013 |

* cited by examiner

*Primary Examiner* — Nabil Hindi
(74) *Attorney, Agent, or Firm* — Finnegan, Henderson, Farabow, Garrett & Dunner, L.L.P.

(57) ABSTRACT

A magnetic recording apparatus in an embodiment includes a magnetic head, a storage, a detector, and a controller. The magnetic head records data on a recording medium. The storage stores first current parameters defining a first current waveform, second current parameters defining a second current waveform, and recording bit sequence information. The detector detects a discontinuity point from the recording bit sequence information. The discontinuity point is defined by a position at which recording bit lengths are discontinuous. The controller controls a waveform of a recording current of the magnetic head, based on the first current parameters at a recording bit that is not next to the discontinuity point and based on the second current parameters at a recording bit that is next to the discontinuity point.

17 Claims, 6 Drawing Sheets

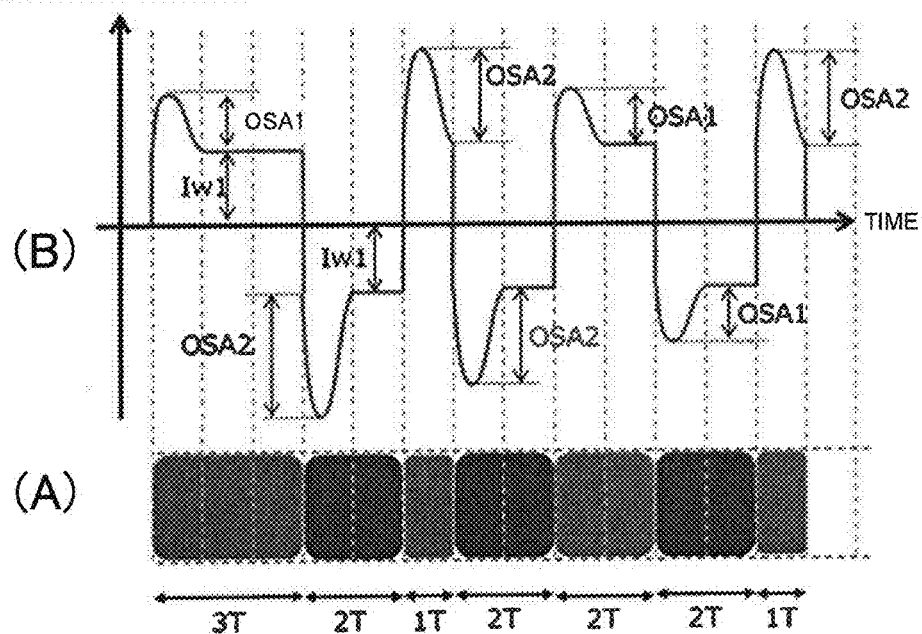
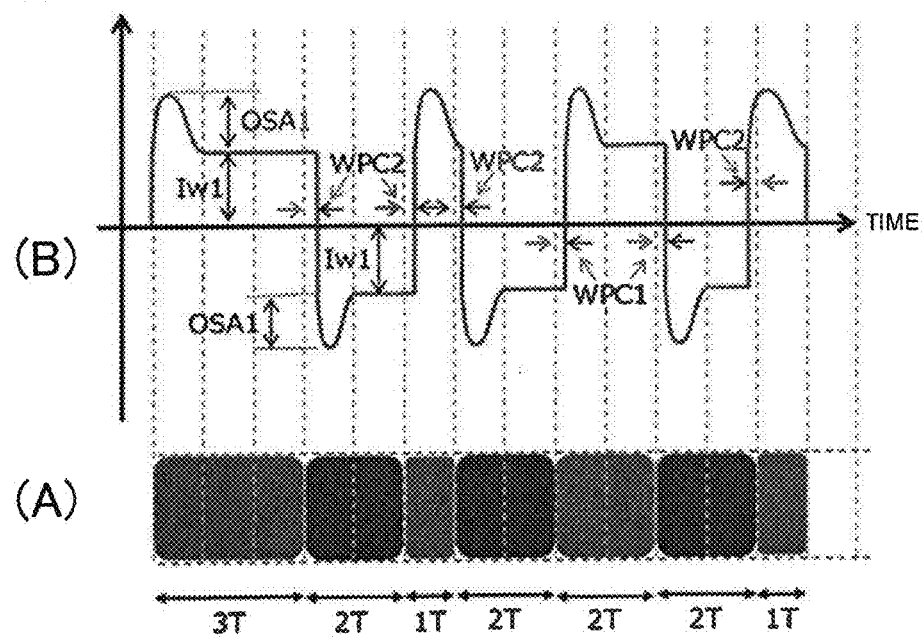

MAGNETIC RECORDING APPARATUS AND RECORDING CURRENT CONTROL APPARATUS

This application is based upon and claims the benefit of priority from Japanese Patent Application No. 2017-149439, filed on Aug. 1, 2017; the entire contents of which are incorporated herein by reference.

FIELD

Embodiments described herein relate generally to a magnetic recording apparatus and a recording current control apparatus.

BACKGROUND

The recording density of a magnetic recording and reproducing apparatus (for example, HDD) increases. As the recording density increases, recording pattern missing increases and deterioration in BER (Bit Error Rate) gradually becomes apparent. Thus, a recording current adjustment method called PDW (Pattern Dependent Write) is under discussion. The PDW method uniquely changes the recording current passed through a recording head according to a recording pattern in which missing is likely to occur. However, inappropriate recording current adjustment mode (PDW mode) may cause deterioration in BER, in contrast.

BRIEF DESCRIPTION OF THE DRAWINGS

FIG. 3 is a schematic diagram (recording pattern, recording current waveform) of a recording current adjustment mode according to a first embodiment.

FIG. 4 is a schematic diagram (recording pattern) of a recording current adjustment mode according to a second embodiment.

DETAILED DESCRIPTION

A magnetic recording apparatus in an embodiment includes a magnetic head, a storage, a detector, and a controller. The magnetic head records data on a recording medium. The storage stores first current parameters defining a first current waveform, second current parameters defining a second current waveform, and recording bit sequence information. The detector detects a discontinuity point from the recording bit sequence information. The discontinuity point is defined by a position at which recording bit lengths are discontinuous. The controller controls a waveform of a recording current of the magnetic head, based on the first current parameters at a recording bit that is not next to the discontinuity point and based on the second current parameters at a recording bit that is next to the discontinuity point.

Figure 1:
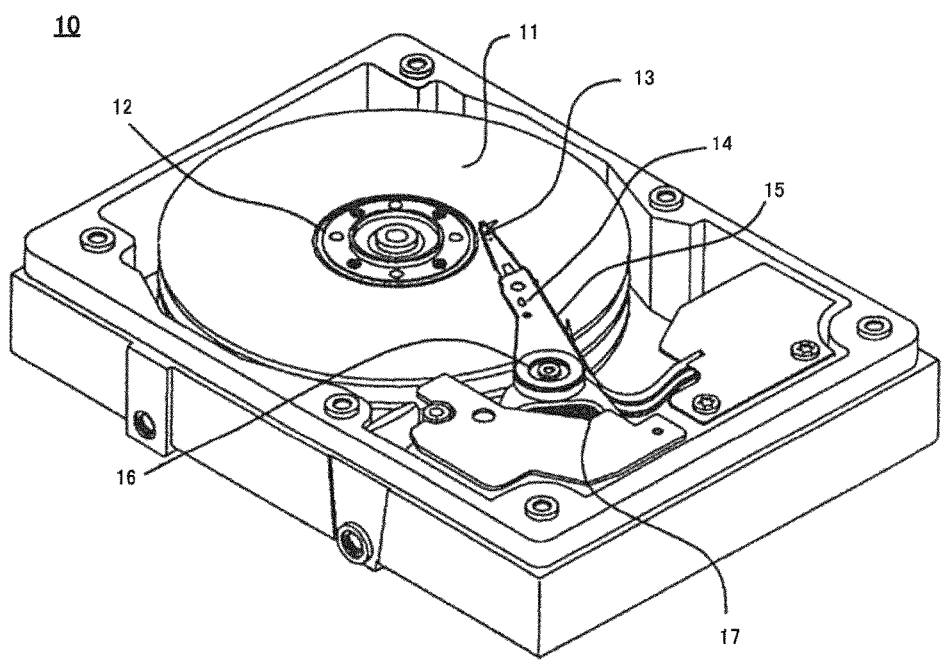
FIG. 1 is a view illustrating a magnetic recording and reproducing apparatus according to an embodiment.

Hereinafter, embodiments will be described in detail referring to the drawings. FIG. 1 illustrates a magnetic recording and reproducing apparatus (HDD (Hard Disk Drive) apparatus) 10 according to an embodiment. The magnetic recording and reproducing apparatus 10 includes a magnetic recording medium 11, a spindle motor 12, and a magnetic head 13. Into/from the magnetic recording medium 11, information is magnetically written and read. The magnetic head 13 magnetically writes and reads the information into/from the magnetic recording medium 11.

The magnetic recording and reproducing apparatus 10 uses a rotary actuator. The magnetic recording medium 11 is attached to the spindle motor 12, and is rotated by a motor (not illustrated) that responds to a control signal from a drive control unit (not illustrated).

When the magnetic recording medium 11 is rotated, a pressing pressure by a suspension 14 and a pressure occurring on a medium opposing surface (also called ABS) of a head slider balance out. As a result, the medium opposing surface (magnetic head 13) of the head slider is held with a predetermined flying amount from the surface of the magnetic recording medium 11.

The suspension 14 is connected to one end of an actuator arm 15 that has a bobbin part holding a drive coil (not illustrated). At the other end of the actuator arm 15, a voice coil motor 17 that is one kind of a linear motor is provided. The voice coil motor 17 can be composed of the drive coil (not illustrated) wound around the bobbin part of the actuator arm 15, and a magnetic circuit that is composed of a permanent magnet and a counter yoke oppositely arranged to hold the coil sandwiched therebetween.

The actuator arm 15 is held by ball bearings (not illustrated) provided at two upper and lower positions of a bearing part 16, and can freely rotationally slide by means of the voice coil motor 17. As a result, the actuator arm 15 can move the magnetic head 13 to an arbitrary position of the magnetic recording medium 11.

The magnetic head 13, the suspension 14 and the actuator arm 15 constitute a magnetic head assembly.

Figure 2:
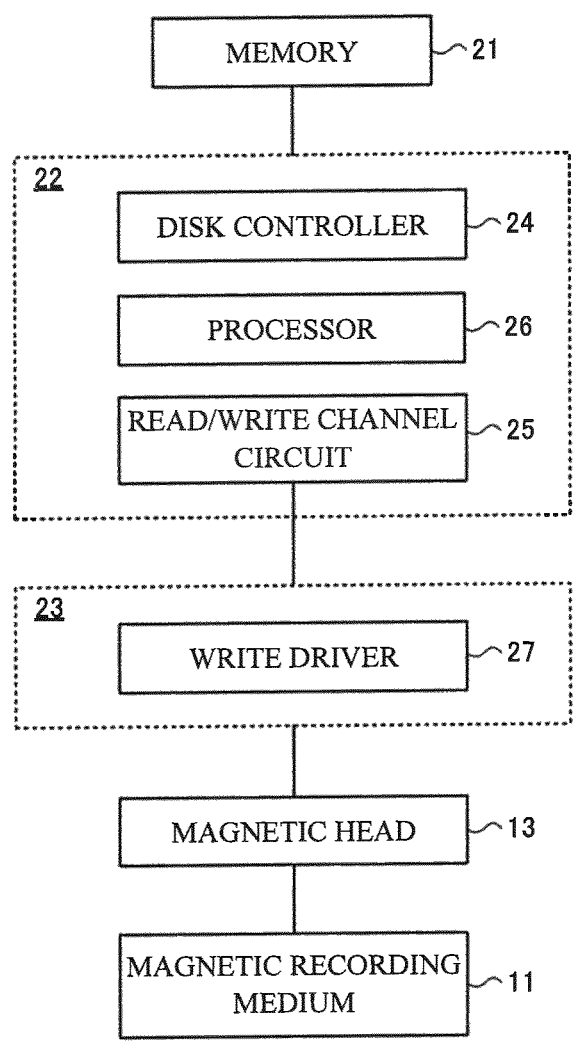
FIG. 2 is a diagram illustrating a control mechanism of the magnetic recording and reproducing apparatus.

FIG. 2 illustrates a control mechanism of the magnetic recording and reproducing apparatus. In this drawing, the magnetic recording and reproducing apparatus includes the magnetic recording medium 11, the magnetic head 13, a memory 21, a system on chip (SOC) 22, and a head amplifier 23.

The SOC 22 includes a disk controller 24, a read/write channel circuit 25, and a processor 26. The head amplifier 23 includes a write driver 27. When writing data into the magnetic recording medium 11, the SOC 22 reads data from the memory 21, and instructs operations of the head amplifier 23 and the magnetic head 13.

The memory 21, the SOC 22, and the head amplifier 23 function as a control circuit (current control device). All or some (for example, the SOC 22 itself) of them can be regarded as the control circuit. This control circuit generally processes data received from the head amplifier 23 or the memory 21. Further, the control circuit controls supply of data to the magnetic head 13 via the head amplifier 23 and write of the data into the magnetic recording medium 11.

The processor 26 can execute a code stored in the memory 21 to instruct the operation (for example, control of a recording current) of the SOC 22. The processor 26 instructs the read/write channel circuit 25 to control the recording current at the magnetic head 13, according to a later-described recording current parameter group. As a result, the read/write channel circuit 25 controls the recording current at the magnetic head 13 via the head amplifier 23.

The memory 21 stores recording bit sequence information and the recording current parameter group. The recording bit sequence information represents a sequence of a plurality of recording bits for recording on the magnetic recording medium 11.

The recording current parameter group is a set of parameters defining the waveform of the recording current at the magnetic head. The recording current parameter group can be classified into a basic current parameter group defining a basic current waveform and a secondary current parameter group defining a secondary current waveform. The basic current parameter group and the secondary current parameter group are used separately in terms of the relation with a discontinuity point of the recording bit sequence.

The discontinuity point means the boundary between adjacent recording bits having different recording bit lengths. It has been found that pattern missing is likely to occur in recording bits before and after the discontinuity point. The discontinuity point means a transition point where the bit length of the recording bit changes. More specifically, for example, a later-described recording pattern of "3T-2T" has discontinuity in bit length occurring at the boundary between recording bits (has a discontinuity point). On the other hand, a recording pattern of "2T-2T" has continuity in recording hit length (has no discontinuity point).

The SOC 22 (read/write channel circuit 25) detects the discontinuity point (where the recording bit lengths are discontinuous) from the recording bit sequence stored in the memory 21. The SOC 22 (read/write channel circuit 25) controls the recording current using the basic current parameters at a recording bit that is not next to (not in contact with) the discontinuity point. On the other hand, the SOC 22 (read/write channel circuit 25) controls the recording current using the secondary current parameters at a recording bit that is next to the discontinuity point. In this event, for a current parameter not included in the secondary current parameters used, the basic current parameter may be used. In other words, the secondary current parameter is applicable in preference to the basic current parameter.

Here, "next to the discontinuity point" means positioning immediately after the discontinuity point, and a position after that is excluded. Besides, "not next to the discontinuity point" means not positioning immediately after the discontinuity point, and a position before the discontinuity point is excluded. More specifically, in the case where a recording hit A, a discontinuity point, and recording bits B, C are arranged in order (in the case where a recording bit A is arranged before a discontinuity point and recording bits B, C continue after the discontinuity point), what corresponds to "next to the discontinuity point" is only the recording bit B, and neither the recording bit A nor C corresponds to the "next to the discontinuity point" (both correspond to "not next to the discontinuity point").

First Embodiment: Adjustment of Overshoot Current of Recording Current

FIG. 3 is a schematic diagram illustrating one example of a recording current adjustment mode according to a first embodiment. (A) of FIG. 3 illustrates one example of a recording pattern, and illustrates a "3T-2T-1T-2T-2T-2T-1T" pattern here. (B) of FIG. 3 illustrates one example of a recording current waveform according to the first embodiment with respect to the recording pattern illustrated in (A) of FIG. 3.

Here, a term "T" such as 3T, 2T is widely used as a unit representing the recording bit length (the bit length of the recording bit). For example, 1T means 1 bit length, and represents a minimum recording bit length in its generation, and is about 11 nm at present. Accordingly, for example, 2T means a recording bit length being twice 1T, and is a 2 bit length. Besides, the drawings here are schematic or conceptual so as to successfully indicate characteristics of this embodiment and are not necessarily the same as real ones.

The current waveform illustrated in (B) of FIG. 3 is divided into an overshoot region and a base region. The base region is a region where current is almost constant, and the current at this time is a base current Iw. The overshoot region is a region that is arranged between the boundary between the recording bits and the base region and where the current has a positive or negative peak. The difference between the peak current and the base current is an overshoot current OSA.

In (B) of FIG. 3, the following parameters are indicated.

Iw1: basic base current [mA] (base current belonging to the basic current parameter group)

OSA1: basic overshoot current [mA] (overshoot current OSA belonging to the basic current parameter group)

OSA2: secondary overshoot current [mA] (overshoot current OSA belonging to the secondary current parameter group)

These illustrated parameters are only characteristic parameters representing the first embodiment, and a real recording current waveform is not always defined by these parameters.

In the first embodiment, OSA2 is used in place of OSA1 in a recording bit next to the discontinuity point of recording bit lengths.

A value of OSA2 is different from a value of OSA1 (OSA2≠OSA1). The value of OSA2 may be smaller or larger than the value of OSA1. However, the value of OSA2 is preferably larger than the value of OSA1. An overshoot current ratio (OSA2/OSA1) is preferably 1.05 or more and 2.00 or less.

Here, OSA2 comprehensively expresses the overshoot current of the recording current preferentially applied in a recording bit next to the discontinuity point of recording bit lengths. Accordingly, all of values of OSA2 indicated in (B) of FIG. 3 do not necessarily need to be the same. The secondary overshoot current OSA2 merely means being different from the basic overshoot current OSA1.

The overshoot current ratio (OSA2/OSA1) may be made different according to the ratio between the recording bit lengths before and after the discontinuity point. For example, the overshoot current ratio can be made 1.05 at a discontinuity point of "3T-2T", and 1.15 at a discontinuity point of "2T-1T". On the other hand, the overshoot current ratio may be made the same value regardless of the ratio between the recording bit lengths at the discontinuity point.

The presence or absence of setting of OSA2 and the value of the overshoot current ratio can be confirmed by analysis or the like of the recording current waveform obtained by measurement of electric properties of the magnetic head 13, the memory 21, the SOC 22, and the head amplifier 23 mounted on the magnetic recording and reproducing apparatus 10, or register values set therein. The analysis of them is also possible not for the magnetic recording and reproducing apparatus 10 itself but only for them extracted.

Second Embodiment: Phase Adjustment of Recording Current

FIG. 4 is a schematic diagram illustrating one example of a recording current adjustment mode according to a second embodiment. (A) of FIG. 4 illustrates one example of a recording pattern, and illustrates a "3T-2T-1T-2T-2T-2T-1T" pattern as as in (A) of FIG. 3. (B) of FIG. 4 illustrates one example of a recording current waveform according to the second embodiment with respect to the recording pattern illustrated in (A) of FIG. 4.

The current waveform illustrated in (B) of FIG. 4 is divided into an overshoot region and a base region. The start point of the overshoot region is shifted from the discontinuity point (the boundary between the recording bits: reference clock). The temporal shift is expressed as a phase adjustment amount WPC. The phase adjustment amount WPC represents a ratio of shift ($\Delta T$) of the start point of the overshoot region to the recording bit length (for example, "2T") by a unit of "%".

In (B) of FIG. 4, the following parameters are indicated.

Iw1; basic base current [mA] (base current Iw belonging to the basic current parameter group)

OSA1: basic overshoot current [mA] (overshoot current OSA belonging to the basic current parameter group)

WPC1: basic phase adjustment amount [%] (phase adjustment amount WPC belonging to the basic current parameter group)

WPC2: secondary phase adjustment amount [%] (phase adjustment amount WPC belonging to the secondary current parameter group)

These illustrated parameters are only characteristic parameters representing the second embodiment, and a real recording current waveform is not always defined by these parameters.

In the second embodiment, WPC2 is used in place of WPC1 in a recording bit next to the discontinuity point of recording bit lengths.

A value of WPC2 is different from a value of WPC1 (WPC2≠WPC1). The value of WPC2 may be smaller or larger than the value of WPC1. The value of WPC2 is preferably −30% or more and 30% or less. The symbol "±" indicates a direction of phase adjustment. For example, −10% means shifting the phase by 10% in a direction of advancing the phase with respect h reference clock, and +10% means shifting the phase by 10% in a direction of delaying the phase.

Here, WPC1 comprehensively expresses the phase adjustment amount of the basic recording current waveform and is adjusted, for example, based on the recording bit at that time and the recording bit before that.

Besides, WPC2 comprehensively expresses the phase adjustment amount preferentially applied in a recording bit next to the discontinuity point of recording bit lengths. Accordingly, all of values of WPC2 indicated in (B) of FIG. 4 do not necessarily need to be the same. The secondary phase adjustment amount WPC2 merely means being different from the basic phase adjustment amount WPC1.

The secondary phase adjustment amount WPC2 may be made different according to the ratio between the recording bit lengths at the discontinuity point. For example, the secondary phase adjustment amount WPC2 can be made 20[%] at a discontinuity point of "3T-2T", and −1[%] at a discontinuity point of "2T-1T". On the other hand, the secondary phase adjustment amount WPC2 may be made the same value regardless of the ratio between the recording bit lengths at the discontinuity point.

The presence or absence of setting of WPC2 and the value thereof can be confirmed by analysis of the magnetic recording and reproducing apparatus 10 itself or the magnetic head 13 as in the first embodiment.

Third Embodiment: Base Current Adjustment of Recording Current

Figure 5:
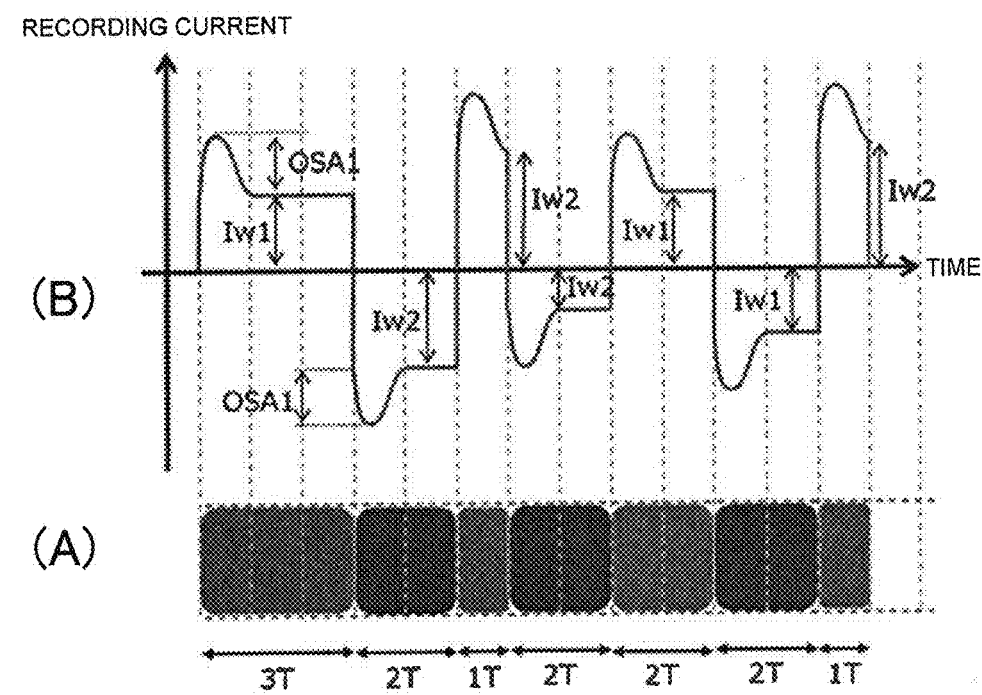
FIG. 5 is a schematic diagram (recording pattern) of a recording current adjustment mode according to a third embodiment.

FIG. 5 is a schematic diagram illustrating one example of a recording current adjustment mode according to a third embodiment. (A) of FIG. 5 illustrates one example of a recording pattern, and illustrates a "3T-2T-1T-2T-2T-2T-1T" pattern as in (A) of FIG. 3, FIG. 4. (B) of FIG. 5 illustrates one example of a recording current waveform according to the third embodiment with respect to the recording pattern illustrated in (A) of FIG. 5.

In (B) of FIG. 5, the following parameters are indicated.

Iw1: basic base current [mA]

OSA1: basic overshoot current [mA]

Iw2: secondary base current [mA] (base current Iw belonging to the secondary current parameter group)

These illustrated parameters are only characteristic parameters representing the third embodiment, and a real recording current waveform is not always defined by these parameters.

In the third embodiment, Iw2 is used in place of Iw1 in a recording bit next to the discontinuity point of recording bit lengths.

A value of Iw2 is different from a value of Iw1 (Iw2≠Iw1). The value of Iw2 may be smaller or larger than the value of Iw1. A ratio between Iw2 and Iw1 (Iw2/Iw1) is preferably 0.5 or more and 2.00 or less.

Here, Iw2 comprehensively expresses the secondary base current preferentially applied in a recording bit next to the discontinuity point of recording bit lengths. Accordingly, all of values of Iw2 indicated in (B) of FIG. 5 do not necessarily need to be the same. The secondary base current Iw2 merely means being different from the basic base current Iw1.

A base current ratio (Iw2/Iw1) may be made different according to the ratio between the recording bit lengths at the discontinuity point. For example, the base current ratio can be made 0.9 at a discontinuity point of "3T-2T", and 1.3 at a discontinuity point of "2T-1T". On the other hand, the base current ratio may be made the same value regardless of the ratio between the recording bit lengths at the discontinuity point.

The presence or absence of setting of Iw2 and the value of the base current ratio can be confirmed by analysis of the magnetic recording and reproducing apparatus 10 itself or the magnetic head 13 as in the first and second embodiments.

Figure 6:
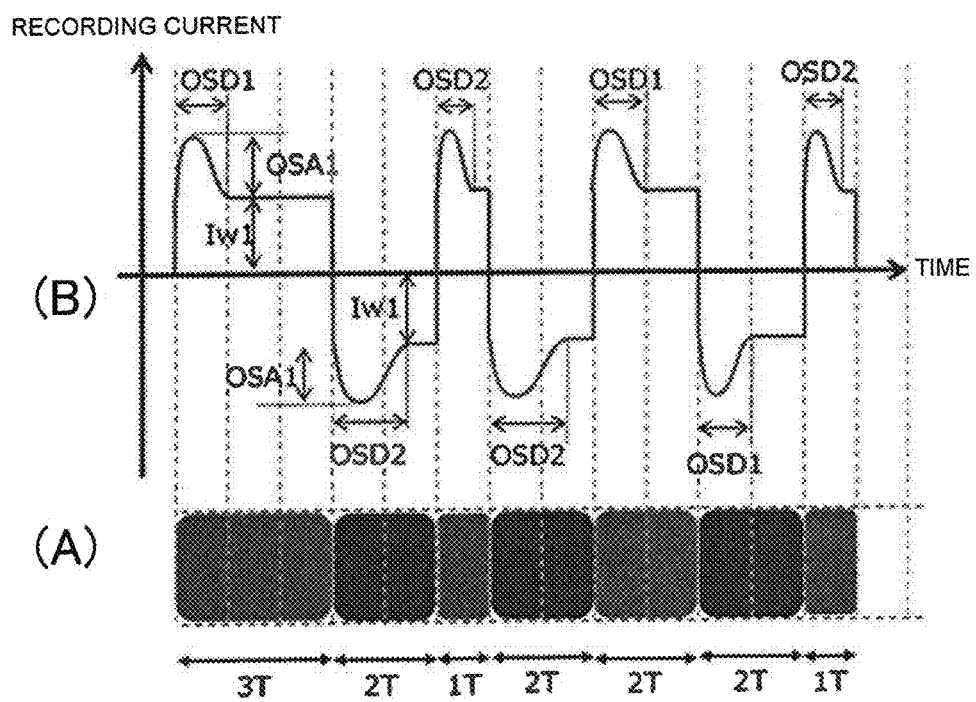
FIG. 6 is a schematic diagram (recording pattern) of a recording current adjustment mode according to a fourth embodiment.

Fourth Embodiment: Overshoot Region Duration Adjustment of Recording Current FIG. 6 is a schematic diagram illustrating one example of a recording current adjustment mode according to a fourth embodiment. (A) of FIG. 6 illustrates one example of a recording pattern, and illustrates a "3T-2T-1T-2T-2T-2T-1T" pattern as in (A) of FIG. 3 to FIG. 5. (B) of FIG. 6 illustrates one example of a recording current waveform according to the fourth embodiment with respect to the recording pattern illustrated in (A) of FIG. 6.

In (B) of FIG. 6, the following parameters are indicated.

Iw1: basic base current
OSA1: basic overshoot current
OSD1: basic duration [psec] (time OSD when the overshoot region continues, belonging to the basic current parameter group)
OSD2: secondary duration [psec] (time OSD when the overshoot region continues, belonging to the secondary current parameter group)

These illustrated parameters are only characteristic parameters representing the fourth embodiment, and a real recording current waveform is not always defined by these parameters.

In the fourth embodiment, OSD2 is used in place of OSD1 in a recording hit next to the discontinuity point of recording bit lengths.

A value of OSD2 is different from a value of OSD1 (OSD2≠OSD1). The value of OSD2 may be smaller or larger than the value of OSD1. A duration ratio (OSD2/OSD1) is preferably 0.5 or more and 2.00 or less.

Here, OSD2 comprehensively expresses the secondary duration preferentially applied in a recording bit next to the discontinuity point of recording bit lengths. Accordingly, all of values of OSD2 indicated in (B) of FIG. 6 do not necessarily need to be the same. The secondary duration OSD2 merely means being different from the basic duration OSD1.

The duration ratio (OSD2/OSD1) may be made different according to the ratio between the recording bit lengths at the discontinuity point. For example, the duration ratio can be made 1.1 at a discontinuity point of "3T-2T", and 1.5 at a discontinuity point of "2T-1T". On the other hand, the duration ratio may be made the same value regardless of the ratio between the recording bit lengths at the discontinuity point.

The presence or absence of setting of OSD2 and the value of the duration ratio can be confirmed by analysis of the magnetic recording and reproducing apparatus 10 itself or the magnetic head 13 as in the first to third embodiments.

Fifth Embodiment: Combination of Embodiments 1 to 4

The first to fourth embodiments can be individually combined. For example, a fifth embodiment is made by combining the first embodiment and the second embodiment.

Figure 7:
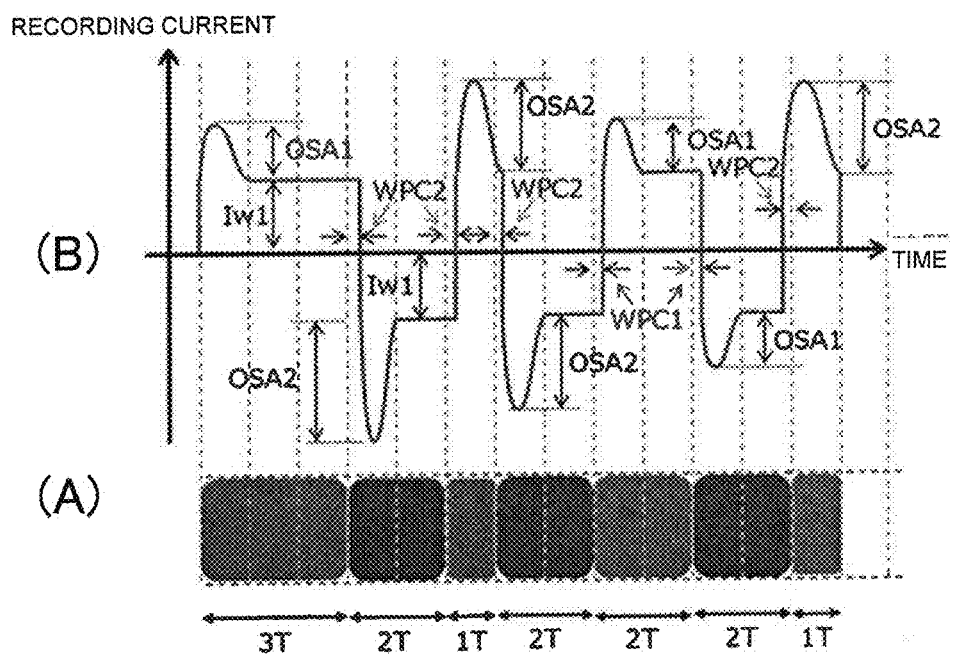
FIG. 7 is a schematic diagram (recording pattern) of a recording current adjustment mode according to a fifth embodiment.

FIG. 7 is a schematic diagram illustrating one example of a recording current adjustment mode according to the fifth embodiment. (A) of FIG. 7 illustrates one example of a recording pattern, and illustrates a "3T-2T-1T-2T-2T-2T-1T" pattern as in (A) of FIG. 3 to FIG. 6. (B) of FIG. 7 illustrates one example of a recording current waveform according to the fifth embodiment with respect to the recording pattern illustrated in (A) of FIG. 7.

In (B) of FIG. 7, the following parameters are indicated.
Iw1: basic base current [mA]
OSA1: basic overshoot current [mA]
WPC1: basic phase adjustment amount [%]
OSA2: secondary overshoot current [mA]
WPC2: secondary phase adjustment amount [%]

Optimal ranges of the values of OSA2 and WPC2 are the same as those in the first to fourth embodiments.

EXAMPLES

Hereinafter, examples will be described.

Example 1: First Embodiment

The property of a recording current adjustment mode according to Example 1 will be described. The recording current adjustment mode according to Example 1 is the same as that in the first embodiment.

Table 1 lists the overshoot current ratio (OSA2/OSA1) in the recording current adjustment mode according to Example 1.

TABLE 1

|  | OSA2/OSA1 |
| --- | --- |
| CONDITION 1 | 1.05 |
| CONDITION 2 | 1.2 |
| CONDITION 3 | 1.5 |
| CONDITION 4 | 2.0 |

In Example 1, the same overshoot current ratio was set at all bit length discontinuity points. Accordingly, four conditions listed in Table 1 are separate recording current waveforms with which the dependence on the overshoot current ratio can be determined.

Using the four overshoot current ratios listed in Table 1, reproduced waveforms with respect to random recording patterns for 500,000 bits were acquired from Read/Write simulations respectively, and BER was evaluated from the acquired reproduced waveforms.

Example 2: Fifth Embodiment

The property of a recording current adjustment mode according to Example 2 will be described.

The recording current adjustment mode according to Example 2 is the same as that in the fifth embodiment.

Table 2 lists the current parameter conditions (WPC1, WPC2, overshoot current ratio: OSA2/OSA1) in the recording current adjustment mode according to Example 2.

TABLE 2

| WPC1[%] | | WPC2[%] | | | | OSA2/OSA1 | | | |
| --- | --- | --- | --- | --- | --- | --- | --- | --- | --- |
| 20 | 20 | 25 | −5 | 5 | −4 | 1.1 | 1.6 | 1.05 | 1.5 |

All of Examples in Table 2 use the "3T-2T-1T-2T-2T-2T-1T" pattern illustrated in (B) of FIG. 7. Accordingly, in Table 2, two conditions of WPC1 and four conditions of WPC2 are listed, and the conditions are written in corresponding locations illustrated in (B) of FIG. 7 respectively in order from the 3T pattern side.

This also applies to the overshoot current ratio (OSA2/OSA1), and the conditions are written in OSA2 values at four locations illustrated in (B) of FIG. 7 respectively in order from the 3T pattern side. The values of Iw1, OSA1 are the same as those in Example 1. Other conditions without description are the same as those in Example 1.

BER was evaluated as in Example 1 using the recording current parameter conditions listed in Table 2.

Comparative Example 1: Without PDW

Figure 8:
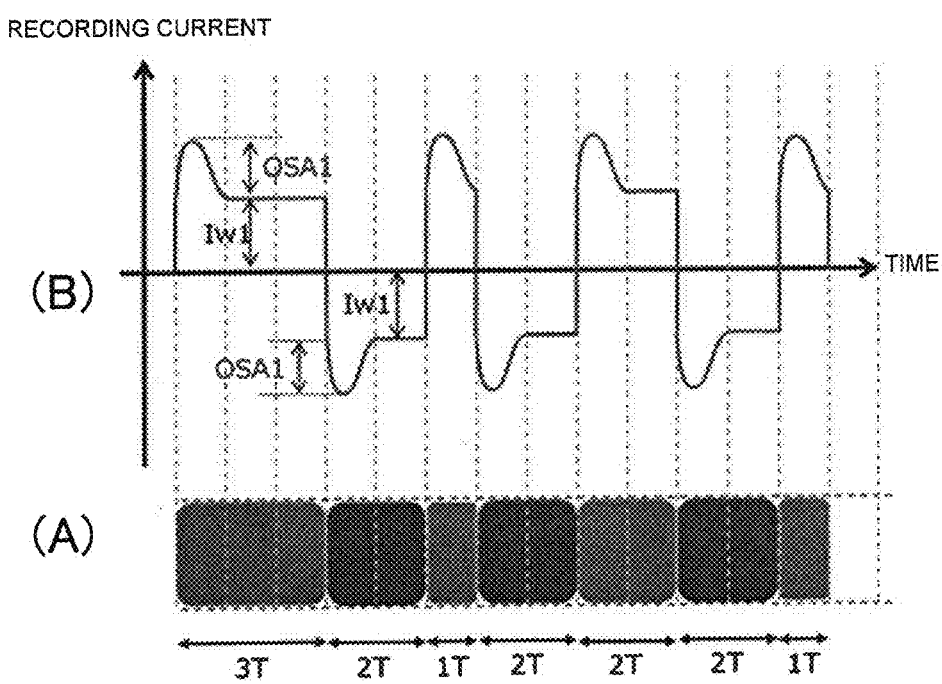
FIG. 8 is a schematic diagram (recording pattern) of a recording current adjustment mode according to Comparative example 1.

The property of a recording current adjustment mode according to Comparative example 1 will be described. FIG. 8 is a schematic diagram illustrating the recording current adjustment mode according to Comparative example 1. (A) of FIG. 8 illustrates one example of a recording pattern, and illustrates a "3T-2T-1T-2T-2T-2T-1T" pattern as in (A) of FIG. 3 to FIG. 7. (B) of FIG. 8 illustrates a recording current waveform according to Comparative example 1 with respect to the recording pattern illustrated in (A) of FIG. 8.

Comparative example 1 includes Iw1, OSA1 defining the basic recording current waveform but does not include the current parameters defining the secondary recording current waveform. In other words, the recording current waveform does not switch corresponding to the discontinuity point of recording bit lengths.

BER was evaluated from the reproduced waveform acquired from Read/Write simulation as in Examples 1, 2. The values of Iw1, OSA1 are the same as those in Examples 1, 2. Other conditions without description are the same, as those in Example 1.

Comparative Example 2

Figure 9:
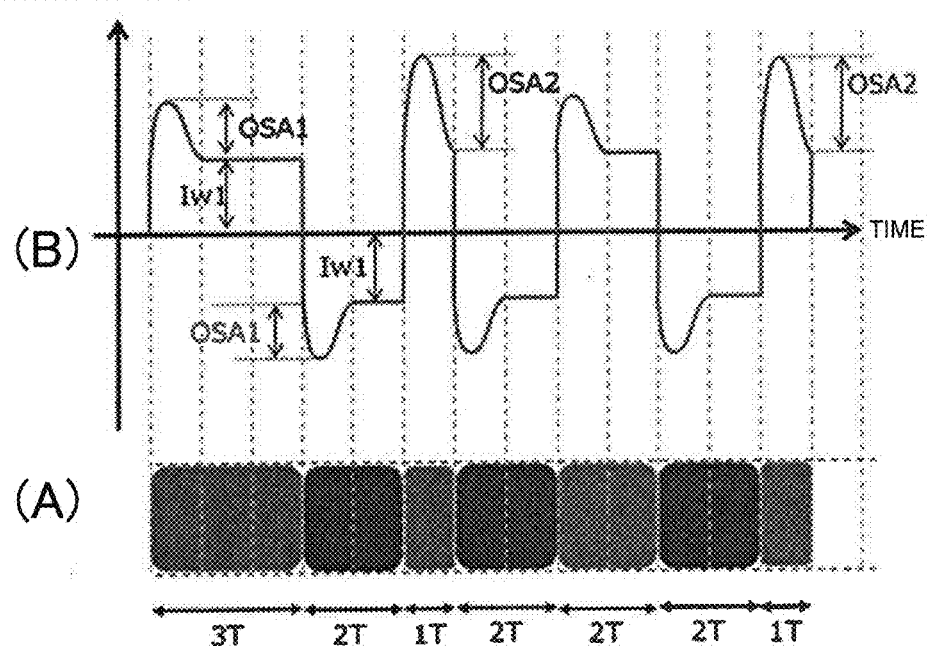
FIG. 9 is a schematic diagram (recording pattern) of a recording current adjustment mode according to Comparative example 2.

The property of a recording current adjustment mode according to Comparative example 2 will be described. FIG. 9 is a schematic diagram illustrating the recording current adjustment mode according to Comparative example 2. (A) of FIG. 9 illustrates one example of a recording pattern, and illustrates a "3T-2T-1T-2T-2T-2T-1T" pattern as in (A) of FIG. 3 to FIG. 8. (B) of FIG. 9 illustrates one example of a recording current pattern in the recording current adjustment mode according to Comparative example 2 with respect to the recording pattern illustrated in (A) of FIG. 9.

Comparative example 2 includes OSA2 defining the recording current waveform in a recording bit of "1T" in addition to Iw1, OSA1 defining the basic recording current waveform.

The first embodiment ((B) of FIG. 3) and Comparative example 3 ((B) of FIG. 9) are different in position of OSA2 in the "3T-2T-1T-2T-2T-2T-1T" pattern. As has been described above, OSA2 is used only for the recording current waveform in the recording bit length of 1T in Comparative example 2. In other words, the recording current waveform is switched corresponding only to two discontinuity points "2T-1T" (the recording current waveform is not switched corresponding to the discontinuity points "3T-2T", "1T-2T").

BER was evaluated from the reproduced waveform acquired from Read/Write simulation as in Examples 1, 2 and Comparative example 1. The values of Iw1, OSA1 are the same as those in Examples 1, 2 and Comparative example 1. The overshoot current ratio (OSA2/OSA1) was set to 1.5, and other conditions without description are the same as those in Example 1.

Comparative Example 3

Figure 10:
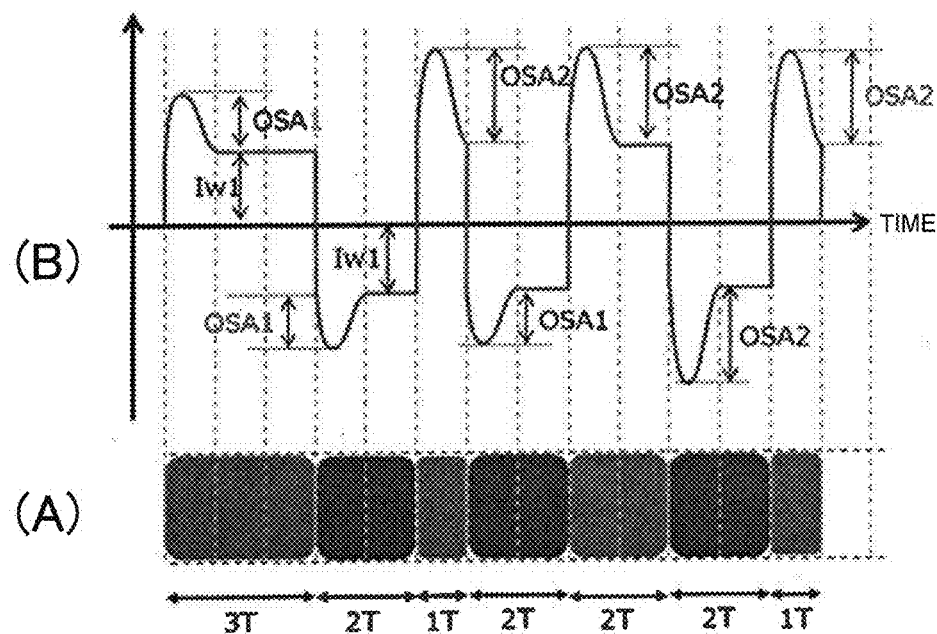
FIG. 10 is a schematic diagram (recording pattern) of a recording current adjustment mode according to Comparative example 3.

The property of a recording current adjustment mode according to Comparative example 3 will be described. FIG. 10 is a schematic diagram illustrating the recording current adjustment mode according to Comparative example 3. (A) of FIG. 10 illustrates one example of a recording pattern, and illustrates a "3T-2T-1T-2T-2T-2T-1T" pattern as in (A) of FIG. 3 to FIG. 9. (B) of FIG. 10 illustrates one example of a recording current pattern in the recording current adjustment mode according to Comparative example 3 with respect to the recording pattern illustrated in (A) of FIG. 10.

Comparative example 3 includes recording current parameters Iw1, OSA1 defining the basic recording current waveform, and OSA2 defining the recording current waveform in a recording bit after "2T". In other words, the recording current waveform is switched corresponding to two discontinuity points "2T-1T" and two non-discontinuity points "2T-2T" (the recording current waveform is not switched at the discontinuity points "3T-2T", "1T-2T").

Comparing the first embodiment ((B) of FIG. 3) and Comparative example 2 ((B) of FIG. 10), it is found that the position of the recording current parameter OSA2 secondarily functioning is different, for example, also in the "3T-2T-1T-2T-2T-2T-1T" pattern.

BER was evaluated from the reproduced waveform acquired from Read/Write simulation as in Example 1, Example 2, Comparative example 1, and Comparative example 2. The values of Iw1, OSA1 are the same as those in Example 1, Example 2, Comparative example 1, and Comparative example 2. A condition of OSA2/OSA1=1.5 was used, and other conditions without description were set to the same as those in Example 1.

Table 3 lists BERs of Examples 1, 2 and Comparative examples 1 to 3 in comparison.

TABLE 3

|  |  | BER |
| --- | --- | --- |
| EXAMPLE 1 | CONDITION 1 | −2.1 |
|  | CONDITION 2 | −2.15 |
|  | CONDITION 3 | −2.3 |
|  | CONDITION 4 | −2.1 |
| EXAMPLE 2 |  | −2.4 |
| COMPARATIVE EXAMPLE 1 |  | −1.8 |
| COMPARATIVE EXAMPLE 2 |  | −1.85 |
| COMPARATIVE EXAMPLE 3 |  | −1.95 |

BER larger on a minus side is more preferable. Accordingly, Examples 1 and 2 are superior in BER to Comparative examples 1 to 3. As described above, it is found that BER can be improved by switching the waveform of the recording current based on this embodiment at all discontinuity points of recording bit lengths.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording apparatus comprising:
a magnetic head configured to record data on a recording medium;
a storage configured to store first current parameters defining a first current waveform, second current parameters defining a second current waveform, and recording bit sequence information;
a detector configured to detect a discontinuity point from the recording bit sequence information, the discontinuity point being defined by a position at which recording bit lengths are discontinuous; and
a controller configured to control a waveform of a recording current of the magnetic head, based on the first current parameters at a recording bit that is not next to the discontinuity point and based on the second current parameters at a recording bit that is next to the discontinuity point.

2. The magnetic recording apparatus according to claim 1, wherein:
the first current parameters includes a first base current Iw1 corresponding to a current in a base region of the waveform, and a first overshoot current OSA1 corresponding to a difference between a peak current in an overshoot region of the waveform and the first base current; and
the second current parameters includes a second overshoot current OSA2 corresponding to a difference between the peak current and the first base current.

3. The magnetic recording apparatus according to claim 2, wherein
an overshoot current ratio (OSA2/OSA1) is 1.05 or more and 2.00 or less, the overshoot current ratio is defined by a ratio between the first overshoot current OSA1 and the second overshoot current OSA2.

4. The magnetic recording apparatus according to claim 3, wherein
a plurality of overshoot current ratios (OSA2/OSA1) are substantially same at a plurality of discontinuity points different in ratio between the recording bit lengths before and after its discontinuity point.

5. The magnetic recording apparatus according to claim 3, wherein
a plurality of overshoot current ratios (OSA2/OSA1) are different from each other at a plurality of discontinuity points different in ratio between the recording bit lengths before and after its discontinuity point.

6. The magnetic recording apparatus according to claim 2, wherein:
the first current parameters includes a first phase adjustment amount WPC1 corresponding to shift of a start point of the overshoot region with respect to the discontinuity point; and
the second current parameters includes a second phase adjustment a WPC2 corresponding to the shift.

7. The magnetic recording apparatus according to claim 6, wherein
the second phase adjustment amount WPC2 is −30% or more and 30% or less with respect to the recording bit length.

8. The magnetic recording apparatus according to claim 6, wherein
a plurality of second phase adjustment amounts WPC2 are different from each other at a plurality of discontinuity points different in ratio between the recording bit lengths before and after its discontinuity point.

9. The magnetic recording apparatus according to claim 1, wherein:
the first current parameters includes a first base current Iw1 corresponding to a current in a base region of the waveform, and a first overshoot current OSA1 corresponding to a difference between a peak current in an overshoot region of the waveform and the first base current; and
the second current parameters includes a second base current Iw2 representing a current in the base region of the waveform.

10. The magnetic recording apparatus according to claim 9, wherein
a base current ratio (Iw2/Iw1) is 0.5 or more and 2.0 or less, the base current ratio is defined by a ratio between the first base current Iw1 and the second base current Iw2.

11. The magnetic recording apparatus according to claim 10, wherein
the base current ratio (Iw2/Iw1) are substantially same at a plurality of discontinuity points different in ratio between the recording bit lengths before and after its discontinuity point.

12. The magnetic recording apparatus according to claim 10, wherein
the base current ratio (Iw2/Iw1) are different from each other at a plurality of discontinuity points different in ratio between the recording bit lengths before and after its discontinuity point.

13. The magnetic recording apparatus according to claim 1, wherein:
the first current parameters include a first base current Iw1 corresponding to a current in a base region of the waveform, a first overshoot current OSA1 corresponding to a difference between a peak current in an overshoot region of the waveform and the first base current, and a first duration OSD1 corresponding to a duration of the overshoot region; and
the second current parameters includes a second duration OSD2 corresponding to a duration of the overshoot region.

14. The magnetic recording apparatus according to claim 13, wherein
a duration ratio (OSD2/OSD1) is 0.5 or more and 2.00 or less, the duration ratio is defined by a ratio between the first duration OSD1 and the second duration OSD2.

15. The magnetic recording apparatus according to claim 14, wherein
the duration ratio (OSD2/OSD1) are substantially same at a plurality of discontinuity points different in ratio between the recording bit lengths before and after its discontinuity point.

16. The magnetic recording apparatus according to claim 14,
the duration ratio (OSD2/OSD1) are different from each other at a plurality of discontinuity points different in ratio between the recording bit lengths before and after its discontinuity point.

17. A current control apparatus comprising:
a storage configured to store first current parameters defining a first current waveform, second current parameters defining a second current waveform, and recording bit sequence information;
a detector configured to detect a discontinuity point from the recording bit sequence information, the discontinuity point being defined by a position at which recording bit lengths are discontinuous; and
a controller configured to control a waveform of a recording current, based on the first current parameters at a recording bit that is not next to the discontinuity point and based on the second current parameters at a recording bit that is next to the discontinuity point.

* * * * *

UNITED STATES PATENT AND TRADEMARK OFFICE
CERTIFICATE OF CORRECTION

PATENT NO. : 10,083,711 B1
APPLICATION NO. : 15/913736
DATED : September 25, 2018
INVENTOR(S) : Yousuke Isowaki et al.

Page 1 of 1

It is certified that error appears in the above-identified patent and that said Letters Patent is hereby corrected as shown below:

In the Claims

Claim 6, Column 11, Lines 36-37, change "a second phase adjustment a WPC2" to --a second phase adjustment amount WPC2--.

Signed and Sealed this
Eighth Day of January, 2019

Andrei Iancu
*Director of the United States Patent and Trademark Office*